United States Patent [19]
Nelson et al.

[11] Patent Number: 5,239,519
[45] Date of Patent: Aug. 24, 1993

[54] COOKING CYCLE TIMER

[75] Inventors: David W. Nelson; Gary M. Grill; Raymond D. Pence; Robert A. Compton, all of Lexington, Ky.

[73] Assignee: Ashland Oil, Inc., Ashland, Ky.

[21] Appl. No.: 674,248

[22] Filed: Mar. 25, 1991

[51] Int. Cl.⁵ .......... G04B 47/00; G04F 8/00; A47J 3/00
[52] U.S. Cl. .................. 368/10; 368/110; 99/280; 99/285
[58] Field of Search .................. 368/7, 9, 10; 99/279-285, 295, 299, 300, 304-305; 219/308

[56] References Cited

U.S. PATENT DOCUMENTS

| | | | |
|---|---|---|---|
| 4,762,055 | 8/1988 | Shimomura | 99/285 |
| 4,838,152 | 6/1989 | Kubicko et al. | 99/280 |
| 4,917,005 | 2/1990 | Knepler | 99/280 |

Primary Examiner—Vit W. Miska
Attorney, Agent, or Firm—Richard C. Willson, Jr.; Stanley M. Welsh

[57] ABSTRACT

An apparatus that prepares food in cycles is achieved by tying in a timer which resets to zero and measures elapsed time from cycle to cycle.

6 Claims, 2 Drawing Sheets

COOKING CYCLE TIMER

BACKGROUND OF INVENTION

1. Field of the Invention

This invention relates to devices to prepare food in accordance with some cooking cycle which then maintains such food at an appropriate serving temperature. More specifically, this invention relates to devices for brewing hot drinks such as coffee or tea.

Presently, many stores provide brewing machines which prepare a hot drink such as coffee in a reservoir which is maintained at a suitable serving temperature. Many such machines have a button to activate a brewing cycle to prepare a defined quantity of the hot drink.

One problem associated with such brewing machines is that the stored hot drink may be maintained at a serving temperature for extended lengths of time, thereby destroying its flavor.

Accordingly, it would be desirable to have some means for determining how long a food has been maintained in a reservoir at its serving temperature.

Another difficulty with conventional machines that prepare a food in accordance with a cycle and store it in a reservoir at a serving temperature is that a clearly visible and easily activated button can be activated at undesirable times.

It is an object of this invention to provide an apparatus that will be capable of determining the period of time between the last initiated cooking or brewing cycle and the moment up to which the reservoir of stored food has been kept at an appropriate serving temperature.

Also as one of the embodiments of this invention is an apparatus to prevent the undesired and inadvertent initiation of a cooking or brewing cycle.

SUMMARY OF THE INVENTION

Broadly, this invention is directed to an apparatus for preparing foods which involves a preparation cycle comprising preparing and storing food. By a preparation cycle is meant food prepared in a sequence in which first a quantity of food is prepared and then stored and maintained at an appropriate serving temperature. A specific example of such equipment would be a Curtis coffee maker sold by Wilbur Curtis Company of Los Angeles, Calif. Essential to this coffee brewing apparatus is a valve through which a quantity of water passes. Once this quantity of water has passed, the valve shuts off and the brewing cycle is complete. The brewed coffee is then maintained at an appropriate serving temperature. Of particular use in this invention is being able to measure how long a brewed coffee has been stored.

We have found that a digital timer sold by Redington Company, powered by a lithium battery will reset to zero and remain at zero so long as two leads to specially designed inputs to the timer provide a complete electrical circuit or current path across such inputs. So long as the current path remains unbroken between these two inputs to the digital clock, the clock remains at zero and does not measure elapsed time. Once the circuit or electrical current path is broken, then the clock immediately starts to measure the time from the moment that the circuit is broken. This is particularly advantageous in the instant invention in connection with a single pole-single throw relay. The single pole-single throw relay completes a circuit at one set of outputs when there is activation current passing through a second set of inputs to the relay. A particularly suitable relay for this invention is sold by the Potter Brumfield Company.

Alternatively, there are other methods for closing a conductive loop across the inputs to a digital timer, such as sold by Redington Company that do not require a single pole-single throw relay. For example, the control board of a typical coffee brewing apparatus or machine contains a single pole-single throw relay which is activated by a current input for one set of inputs, which in turn cause a complete current circuit in a second set of outputs. To obtain an embodiment of this invention, one replaces the original single pole-single throw relay with an equivalent single pole-double throw relay, wherein two of the set of four outputs controls a solenoid valve and the remaining two provide circuit closure across two inputs to a resetting timer, such as sold by Redington Company.

This invention preferably uses a single pole-single throw relay which is activated by a voltage and current present while a solenoid valve is open. However, any relay can be used, such as a single pole-double or higher throw relay. But with such higher throw relays or their equivalent, only two conductive completing circuit outputs are needed. The solenoid valve in the instant invention is a valve through which food or water passes during a cooking or brewing cycle. Recognizing that the presence of a solenoid valve provides the ideal point at which to tie in an electric timer so as to measure brewing cycle is a key aspect of a preferred embodiment of the instant invention.

Description of the Preferred Embodiments

Figure 1:
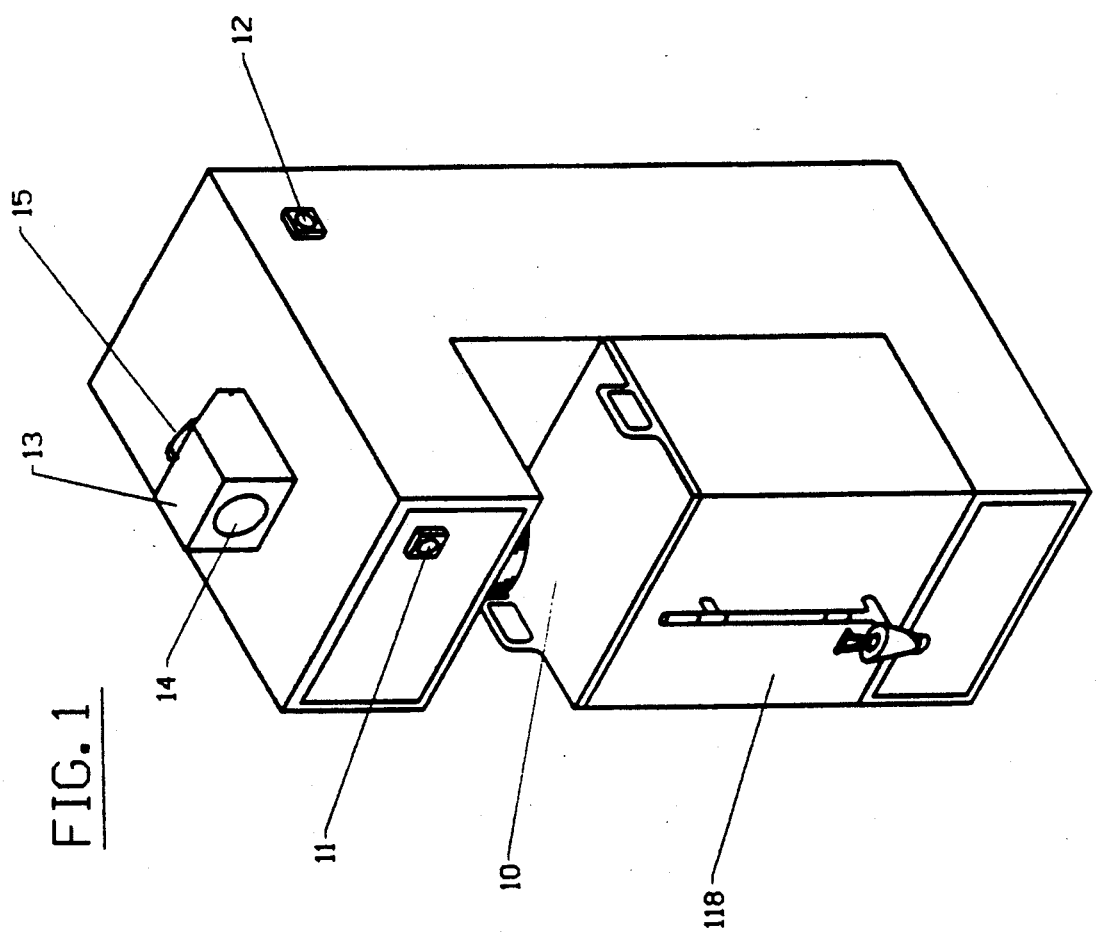
FIG. 1 is a prospective view of an apparatus of this invention.
Figure 2:
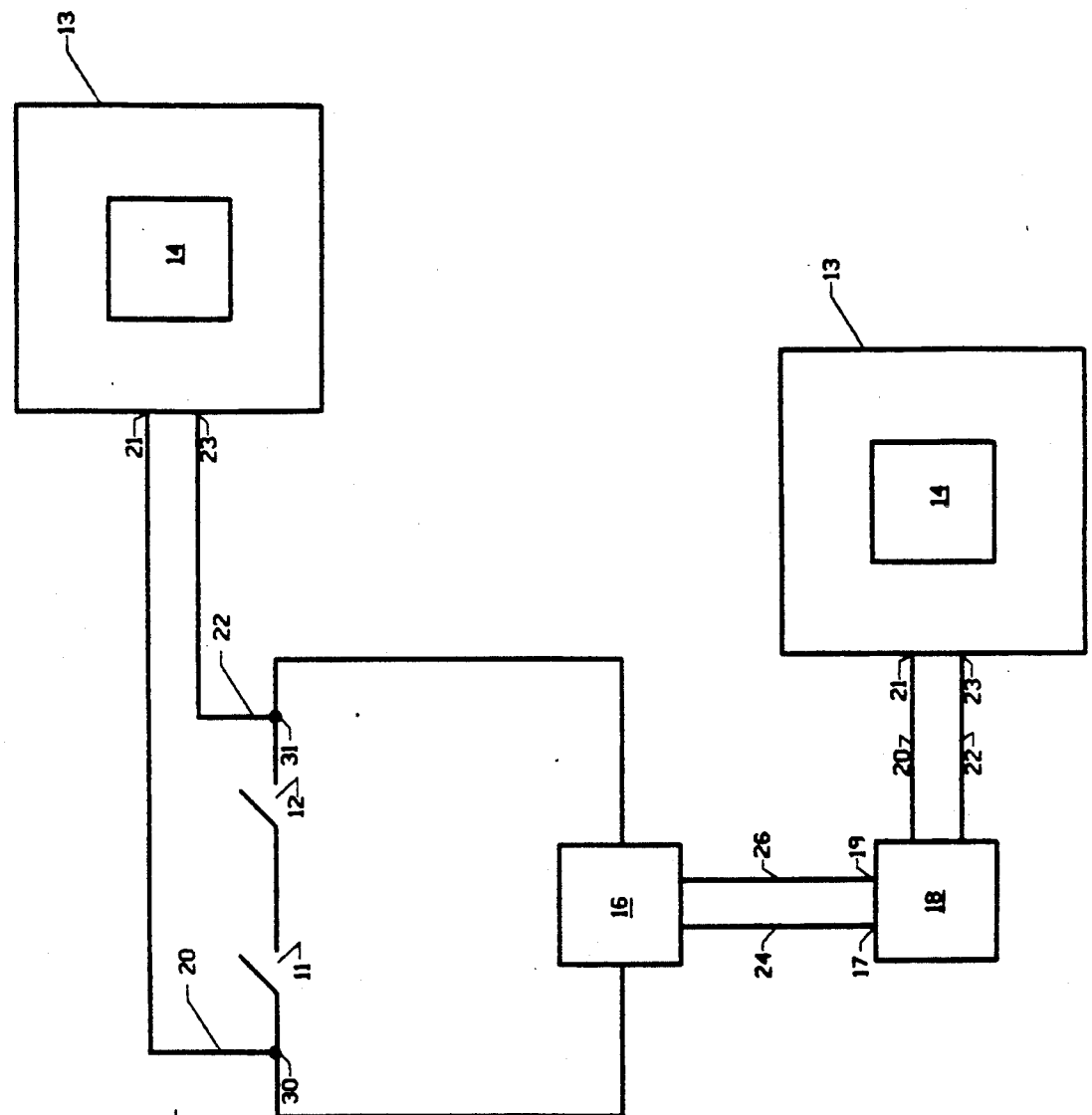
FIG. 2 is a schematic diagram of the wiring system appropriate to triggering both a brewing cycle and a timer. Two alternative locations for operatively connecting timer 13 are shown. One of these alternatives is depicted in phantom outline.

In FIG. 1 is a perspective view of an apparatus of this invention comprising: a brewing apparatus 10, brewing cycle buttons 11 and 12, timer 13, timer display 14, connections 15, reservoir 118. In operation, the apparatus of FIG. 1 requires that to initiate a brewing cycle, buttons 11 and 12 must be pressed simultaneously or substantially simultaneously. Were button 11 or 12 pressed separately, no brewing cycle would be initiated. Clearly as arranged, button 11 is easily visible and readily observed by anyone using apparatus 10. Button 12 has been located on the side away from a clearly observed or visible point so that it will only be pushed by someone knowledgeable and aware of its existence. This then prevents the undesired activation of a brewing cycle by pressing button 11 above. Referring to FIG. 2 is a schematic arrangement showing buttons 11 and 12 schematically. Only by having switches 11 and 12 both closed will a complete circuit be formed which initiates brewing system 10. Timer 13 is also arranged so that only by activating both switches will the timer be reset. Timer 13 is a type of clock which resets to zero time when inputs 21 and 23 into timer 13 are closed by a continuous current loop. Timer 13 will continue to measure time from the point of its initial activation; namely, the initiation of a brewing cycle by the depressing of buttons 11 and 12 simultaneously, up until that moment when buttons 11 and 12 are again simultaneously or substantially simultaneously activated.

Referring to the schematic drawing shown in FIG. 2, there are two switches 11 and 12 corresponding to buttons 11 and 12 of FIG. 1; a schematic view of solenoid valve 16 with conductive leads 24 and 26 operatively connected to a single pole-single throw relay 18; and single pole-single throw relay 18 is operatively connected by conductive leads 20 and 22 to inputs 21 and 23 of timer 13 having display 14. Briefly, the operation is as follows when switches 11 and 12 are closed: solenoid valve 16 becomes activated and remains activated and open for a period of time determined by the amount of food, or in this case water, which passes through the valve activated by solenoid valve 16. So long as solenoid valve 16 remains open and active, in other words, so long as there is a signal activating solenoid valve 16, current will pass through leads 24 and 26. Any active current passing through leads 24 and 26 causes the single pole-single throw relay to complete the circuit involving leads 20 and 22. Relay 18 with leads 20 and 22 completes a conductive circuit across inputs 21 and 23 of timer 13 and thereby causes a display of zero for so long as the circuit is closed. As soon as solenoid valve 16 closes turning off the flow of water, then current through 24 and 26 conduits ceases, thereby causing single pole-single throw relay 18 to open. When single pole-single throw relay 18 opens, the conductive circuit across inputs 21 and 23 is broken. As soon as the circuit is broken, timer 13 begins to measure elapsed time. The time elapsed is shown by display 14 until solenoid valve 16 again induces current through leads 24 and 26.

Examples of suitable equipment for carrying out a brewing cycle of this invention are Bunn System 3 coffee brewer sold by Bunn-O-Matic Corporation, Illinois; and other coffee brewers sold by Bloomfield Industries, Illinois, e.g. an 8761 Integrity ½-1 gallon Satellite Brewer; and Brewmatic, Los Angeles, Calif., e.g. Models 1032550, 1032510 or 1800521.

Examples of suitable timers for this invention are Model 7600-730 and Model 7600-630 sold by Redington Counter, Inc., 130 Addison Road, Windsor, Conn.; Model CUB3T and Model CUB3TR sold by Red Lion Control, York, Penn.; and Model QTE140 sold by Applied Technical Systems, Shreveport, La.

Examples of single pole-single throw relays suitable for this invention are relay part no. W88UKADX-4 sold by Magnicraft, Chicago, Ill. and Mamardneck, N.Y.; Model A314XaX48P sold by Struthers-Dunn, Darling, S.C.; Models KUEP3A15 or K10P11A15-120 V or KRPA5AG120 sold by Potter & Broomfield, Inc., a Siemen's Company, Princeton, Ind.; Models RHN1KB-U-AC120 or RHN12B-1-AC120 V sold by IDEC Systems & Controls Corp., Santa Clara, Calif.; other companies which sell appropriate relays are: OMRON, Illinois; Guardian Electric Manufacturing Company, Illinois; and Square D, Illinois.

It is, of course, contemplated in this invention that with respect to timer 13 it is possible to arrange the reactivation of timer 13 or even the activation of a brewing cycle as a result of depressing only a single button.

Requiring two buttons to initiate a brewing cycle, is one variation or embodiment of an invention within the scope of this specification. The second button is preferably located in a position not readily observed, but yet readily reached so that button 11, the one clearly visible can be pushed along with button 12 to activate a brewing cycle.

For purposes of this specification and claims, a brewing cycle, or a cooking cycle, is intended to mean only that portion of a food preparation cycle which involves preparation, but not storage at a serving temperature.

MODIFICATIONS

Specific embodiments discussed are intended to be only illustrative of the invention disclosed by this specification. Variation on these embodiments are readily apparent to a person of skill in the art based upon the teachings of this specification and are therefore intended to be included as part of the inventions disclosed herein. For example, one modification of this invention would be to have the equivalent of a relay 18 incorporated into timer 13, so that contacts through conductive conduits 24 and 26 into inputs 17 and 19 (which are now part of timer 13) cause timer 13 to reset to zero and remain at zero for so long as current is entering or leaving inputs 17 and 19. Clearly, any two points which pass current only during the equivalent of a brewing cycle for a hot drink such as coffee are preferred for operative connection to inputs 17 and 19, so as to not include the cooking or brewing cycle portion of a food preparation cycle. An example of two such points is across the solenoid 16 which controls the solenoid valve through which water or other liquid passes during a brewing cycle.

In FIG. 2, there are shown two output leads 20 and 22 in phantom representation at contact points 30 and 31 across a switch which has two parts; namely, switches 11 and 12. These phantom leads 20 and 22 are connected to a timer 13 shown in phantom outline. Clearly, when switches 11 and 12 are activated simultaneously, then phantom timer 13 will reset to zero and begin measuring elapsed time as soon as one or both switches 11 and 12 are opened.

Reference to commercial products and their manufacturers, especially by way of serial numbers, product numbers, or brand names made in the specification is intended to result in such products and readily available product literature from manufacturers of such products being expressly incorporated herein by reference including any patents or other literature references cited within such documents.

What is claimed is:

1. In an apparatus that employs a food preparation cycle comprising preparing and storing food at a serving temperature, wherein a subsequent food preparation cycle is initiated by means of a switch, the improvement which comprises: having a timer means for measuring and displaying an elapsed period of time operatively connected to said apparatus so that said timer is reset to display and measure the length of time elapsed from a moment when said switch last initiated some such food preparation cycle up to some moment just before the next cycle is initiated by means of said switch.

2. The apparatus of claim 1, wherein said food preparation cycle is a brewing cycle for a hot beverage that utilizes a continuously activated valve until said brewing cycle is complete, and wherein said timer is operatively connected to a relay that remains closed so long as said valve is activated.

3. The apparatus of claim 2, wherein said timer resets to zero when a closed circuit is operatively connected to it and begins measuring elapsed periods of time as soon as said closed circuit is broken.

4. The apparatus of claim 1, wherein said switch comprises at least two separately activateable switches which must be activated substantially simultaneously before said food preparation cycle is initiated.

5. The apparatus of claim 2, wherein said relay is a single pole-single throw relay operatively connected in parallel across said valve.

6. The apparatus of claim 1, wherein said apparatus that employs a food preparation cycle, has a solenoid which is activated during each brewing cycle by opening a solenoid activated valve which is open so long as current is passing through said solenoid; and wherein there is a single pole-single throw relay which has at least four leads, one set of leads being appropriate to passing current, the current leads, and another set of leads, the circuit leads, being appropriate to completing a conductive circuit across input contacts whenever there is current passing through said current leads, said current leads being operatively connected to said solenoid so that any current passing through said solenoid causes current to also pass through said current leads of said relay, and said circuit leads being operatively connected across inputs to said timer which resets to zero whenever said conductive circuit is closed, and begins to measure elapsed time as soon as said conductive circuit is open; whereby an apparatus capable of measuring elapsed time from cycle to cycle is achieved.

* * * * *